United States Patent
Olds et al.

(10) Patent No.: US 11,945,578 B2
(45) Date of Patent: Apr. 2, 2024

(54) APPARATUS AND METHODS FOR LIMITING TRAILING EDGE DEFLECTION IN AIRCRAFT FOLDING WING TIPS

(71) Applicant: The Boeing Company, Chicago, IL (US)

(72) Inventors: Jeffrey Michael Olds, Seattle, WA (US); Eric George Gruner, Seattle, WA (US); Billy P. Tung, Seattle, WA (US); Eric Dwight Blohm, Bellevue, WA (US)

(73) Assignee: The Boeing Company, Arlington, VA (US)

( * ) Notice: Subject to any disclaimer, the term of this patent is extended or adjusted under 35 U.S.C. 154(b) by 277 days.

(21) Appl. No.: 17/504,074

(22) Filed: Oct. 18, 2021

(65) Prior Publication Data

US 2023/0118630 A1    Apr. 20, 2023

(51) Int. Cl.
*B64C 3/56* (2006.01)
*B64C 3/54* (2006.01)
*B64C 23/06* (2006.01)

(52) U.S. Cl.
CPC .......... *B64C 3/56* (2013.01); *B64C 3/54* (2013.01); *B64C 3/546* (2013.01); *B64C 23/069* (2017.05)

(58) Field of Classification Search
CPC ............. B64C 3/54; B64C 3/546; B64C 3/56
See application file for complete search history.

(56) References Cited

U.S. PATENT DOCUMENTS

| | | | |
|---|---|---|---|
| 6,260,799 B1 * | 7/2001 | Russ | B64C 3/56 244/49 |
| 10,793,251 B2 | 10/2020 | Kamila et al. | |
| 11,077,931 B2 | 8/2021 | Kamila et al. | |
| 2020/0039630 A1 * | 2/2020 | Kamila | B64C 23/065 |
| 2020/0039631 A1 | 2/2020 | Elenbaas et al. | |
| 2020/0247526 A1 | 8/2020 | Dees et al. | |

* cited by examiner

*Primary Examiner* — Nicholas McFall
*Assistant Examiner* — Terri L Filosi
(74) *Attorney, Agent, or Firm* — Hanley, Flight & Zimmerman, LLC

(57) ABSTRACT

Apparatus and methods for limiting trailing edge deflection in aircraft folding wing tips are disclosed herein. An example aircraft wing disclosed herein includes a fixed wing portion. The fixed wing portion includes an outboard rib. The aircraft wing also includes a wing tip moveably coupled to the fixed wing portion. The wing tip is moveable between an extended position and a folded position. The wing tip includes an inboard rib that is disposed in a trailing edge section of the wing tip. The wing tip includes a stop plate coupled to the inboard rib. The stop plate extends inboard from the inboard rib such that when the wing tip is in the extended position, the stop plate is disposed below a portion of the outboard rib of the fixed wing portion to limit upward deflection of the trailing edge section of the wing tip relative to the fixed wing portion.

20 Claims, 9 Drawing Sheets

US 11,945,578 B2

APPARATUS AND METHODS FOR LIMITING TRAILING EDGE DEFLECTION IN AIRCRAFT FOLDING WING TIPS

FIELD OF THE DISCLOSURE

This disclosure relates generally to aircraft and, more particularly, to apparatus and methods for limiting trailing edge deflection in aircraft folding wing tips.

BACKGROUND

It is generally known that longer, lighter and/or thinner wings on aircraft are more aerodynamically efficient than shorter, heavier wings. Likewise, higher aspect ratio wings produce more efficient flight than lower aspect ratio wings. An aspect ratio of a wing is the ratio of its length to its breadth (chord). Therefore, in general, longer, narrower wings can produce more efficient flight (e.g., reduced fuel consumption). However, taxiway spacing and gate locations for many airports may not provide adequate spacing to accommodate such large wingspans. One approach is to use folding wing tips on aircraft with longer wingspans. After landing, the wing tips can be folded (upwards, downwards, forward, aft or a combination thereof) to reduce the wingspan of the aircraft. This may enable the aircraft to maintain a longer wingspan during flight (e.g., to be more efficient for flight) but still navigate narrower locations at airports.

SUMMARY

An example aircraft wing disclosed herein includes a fixed wing portion. The fixed wing portion includes an outboard rib along an outboard side of the fixed wing portion. The aircraft wing also includes a foldable wing tip, that is, a wing tip that is moveably coupled to the fixed wing portion about a hinge axis. The wing tip is moveable between an extended position and a folded position. The wing tip includes an inboard rib along an inboard side of the wing tip. The inboard rib is disposed in a trailing edge section of the wing tip. The wing tip also includes a stop plate coupled to the inboard rib. The stop plate extends inboard from the inboard rib such that when the wing tip is in the extended position, the stop plate is disposed below a portion of the outboard rib of the fixed wing portion to limit upward deflection of the trailing edge section of the wing tip relative to the fixed wing portion.

An example aircraft disclosed herein includes a fuselage and a fixed wing portion extending from the fuselage. The fixed wing portion includes an outboard rib in a trailing edge section of the fixed wing portion. The outboard rib has a top flange. The aircraft also includes a wing tip rotatably coupled to the fixed wing portion. The wing tip is moveable between an extended position and a folded position. The wing tip includes an inboard rib in a trailing edge section of the wing tip and a stop plate coupled to the inboard rib. The stop plate extends inboard from the inboard rib such that when the wing tip is in the extended position, the stop plate overlaps with the top flange of the outboard rib in a vertical direction to limit upward deflection of the trailing edge section of the wing tip.

An example method of reducing drag on an aircraft during flight is disclosed herein. The example method includes moving a wing tip of a wing of the aircraft from a folded position to an extended position. The wing has a fixed wing portion. The wing tip is moveably coupled to the fixed wing portion. The fixed wing portion has a trailing edge section with a rub strip. The wing tip has a trailing edge section with a stop plate. The method includes flying the aircraft. The method also includes, in response to experiencing loads on the wing, abutting the stop plate on the trailing edge section of the wing tip with the rub strip on the fixed wing portion to maintain trailing edges of the wing tip and the fixed wing portion in alignment.

BRIEF DESCRIPTION OF THE DRAWINGS

FIG. 6 shows the example outboard rib and the example inboard rib spaced apart from each other.

Figure 1:
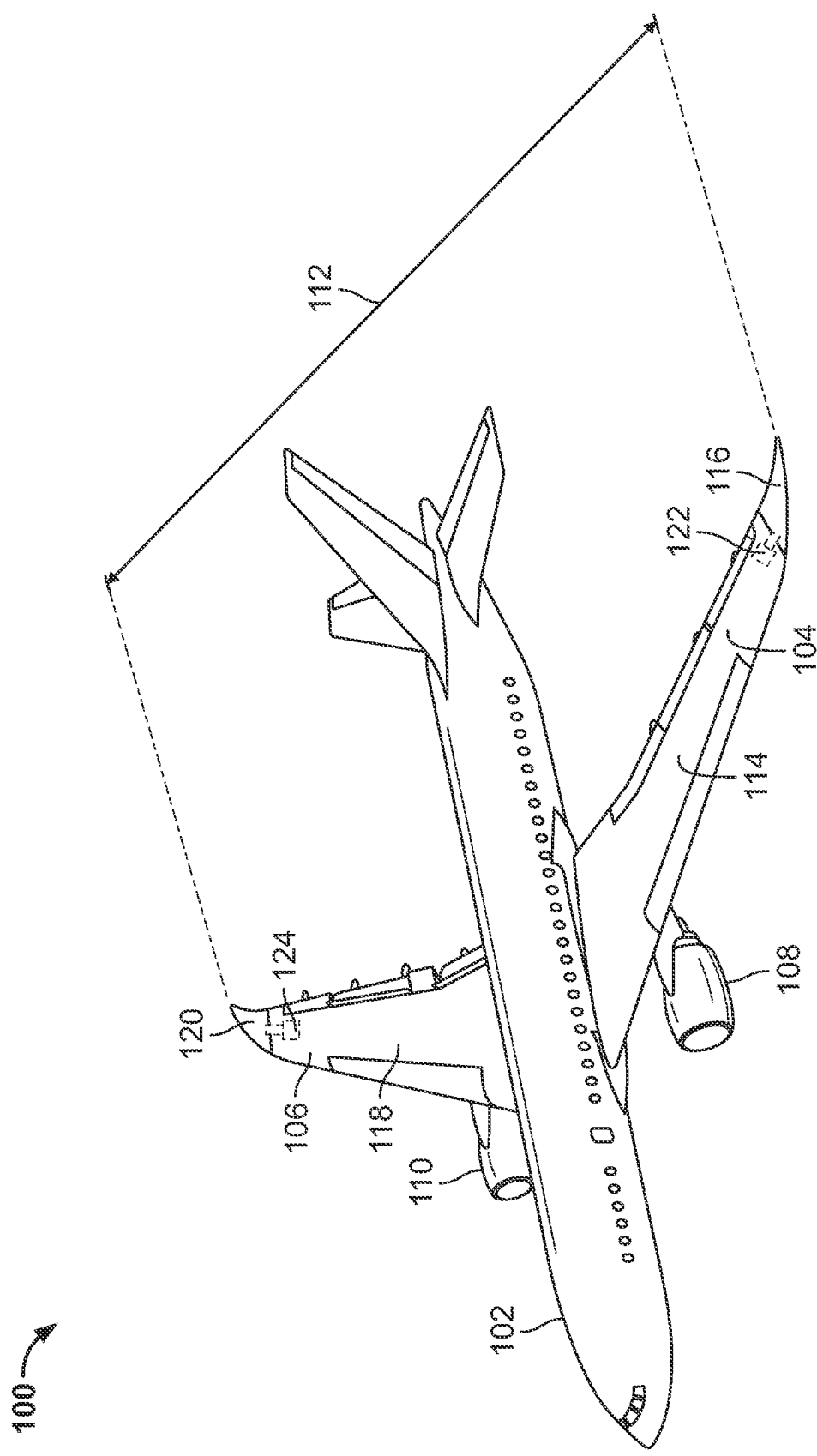
FIG. 1 illustrates an example aircraft with folding wing tips in which examples disclosed herein may be implemented.

The figures are not to scale. Instead, the thickness or other dimension(s) of layers or regions may be enlarged in the drawings for ease of illustration. Although the figures show layers and regions with clean lines and boundaries, some or all of these lines and/or boundaries may be idealized. In reality, the boundaries and/or lines may be unobservable, blended, and/or irregular. In general, the same reference numbers will be used throughout the drawing(s) and accompanying written description to refer to the same or like parts. As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

DETAILED DESCRIPTION

Disclosed herein are example stop plates for use on aircraft with folding wing tips and related methods of installing such stop plates. The example stop plates disclosed herein can be used to limit (e.g., reduce, prevent) upward deflection of a section of a folding wing tip relative to the fixed wing portion of the wing. This helps to improve airflow along the wing and limit potential drag otherwise caused by such deflection.

Before turning to the detailed aspects of the example stop plates, a brief discussion of folding wing tips is provided. It is generally known that longer, lighter and/or thinner wings are more aerodynamically efficient than shorter, heavier wings. Likewise, higher aspect ratio wings produce more efficient flight than lower aspect ratio wings. An aspect ratio of a wing is the ratio of its length to its breadth (chord). Therefore, in general, longer, narrower wings can produce more efficient flight (e.g., reduced fuel consumption). However, existing airports present challenges to aircraft having relatively large wingspans (e.g., the distance between the ends or tips of the wings). Airport designs are based on International Civil Aviation Organization (ICAO) Codes A through F, which establish dimensional limits on wingspans, landing gear, width, length, etc. Many airports are designed to accommodate aircraft up to ICAO Code E, which limits wingspans to less than 65 meters so that aircraft can fit through runways, taxiways, gate areas, etc. Therefore, one approach for aircraft with larger wingspans (e.g., greater than 65 meters) is to employ folding wing tips, which enable the wingspan of the aircraft to be reduced so that the aircraft can fit within the current airport infrastructure (e.g., parking areas, taxiways, etc.).

In regards to an aircraft having folding wing tips, each wing of the aircraft includes an inboard or fixed wing portion and a movable or non-fixed outboard wing portion, i.e., the wing tip, that is moveably coupled to the fixed wing portion. In particular, the wing tips are rotatably coupled to the respective fixed wing portions via hinges. Each wing tip is moveable (rotatable) between an extended position (sometimes referred to as a deployed position, a flight position, or an unfolded position) in which the wing tip extends generally outward from the fixed wing portion and a folded position (sometimes referred to as a stowed or stored position) in which the wing tip is rotated upward to decrease the overall wing span of the aircraft. To move or transition the wing tips from the extended position to the folded position (e.g., after landing), the aircraft includes folding wing tip actuation systems. The actuation systems include one or more actuators located between the fixed wing portions of the wings and the wing tips. The wings may include locking mechanisms to lock or secure the wing tips in their extended position during flight. After landing, the locking mechanisms are disengaged, and the actuators move (e.g., lift, transition, rotate, etc.) the wing tips about their respective hinges from the extended position to the folded position. Similarly, before take-off, the actuators move the wing tips downward to the extended position and the locking mechanisms are activated to lock the wing tips in the extended position.

In some examples, the fixed wing portion and the wing tip have wing boxes (e.g., box structures formed by spars and ribs). The wing tip is rotatably (e.g., hingeably) coupled to the fixed portion at the wing boxes. The wing boxes are pinned or locked together the wing tip is in the extended position. However, the leading and trailing edge sections of the wing tip that are outside of the wing box are discontinuous with the leading and trailing edge sections of the fixed wing portion. In particular, the leading and trailing edge sections of the wing tip are cantilevered off of the wing box and are not directly pinned or locked to the adjacent sections on the fixed wing portion. During operation—that is, when the aircraft is in flight, the wing generates lift that results in wing bending (e.g., the wing tip is loaded in the upward direction), which is reacted from the wing tip back to the wing root (e.g., at the side of body). This wing bending along a discontinuous span can cause the leading and/or trailing edge sections of the wing tip to deflect or move relative to the adjacent sections of the fixed wing portion. This can disrupt the airflow over/under the wing and result in loss of lift and reduced aerodynamic performance.

Disclosed herein are example stop plates that can be used to limit such deflection of a section of the wing tip that is outside of the main wing box. For example, the trailing edge section of the wing tip has an inboard rib along the inboard side of the wing tip. The inboard rib is the most inboard rib of the trailing edge section. An example stop plate is coupled (e.g., via one or more fasteners) to the inboard rib. The stop plate can be a plate constructed of aluminum, for example. The stop plate is coupled to the inboard rib such that the stop plate extends inboard of the inboard rib (i.e., toward the fixed wing portion). When the wing tip is in the extended position, a portion of the stop plate is disposed below a portion of the trailing edge section of the fixed wing portion. As such, if the wing is subject to bending, the stop plate engages the fixed wing portion, which limits (e.g., reduces, prevents) upward deflection of the trailing edge section of the wing tip relative to the fixed wing portion. This arrangement, which maintains the trailing edge of the wing tip in alignment with the trailing edge of the fixed wing portion, enables the loads and deflections from the folding portion of the trailing edge to function in the same ways as a conventional, continuous trailing edge found on non-folding wing tip designs.

In some examples, the trailing edge section of the fixed wing portion has an outboard rib along an outboard side of the fixed wing portion. In some examples, the outboard rib has a top flange. When the wing tip is in the extended position, the stop plate extends inboard from the inboard rib and is at least partially disposed below the top flange of the outboard rib. In other words, the stop plate overlaps with the top flange of the outboard rib in the vertical direction. This limits the upward deflection of the trailing edge section of the wing tip relative to the fixed wing portion. In some examples, a rub strip (which may also be referred to as a second stop plate) is coupled to a bottom side of the top flange. The stop plate is in contact with the rub strip and/or contacts the rub strip during loading. Using a rub strip reduces wear and damage to the structural components of the fixed wing portion. The stop plate and the rub strip may be referred to as a catch system. In some examples, the stop plate and/or the rub strip are constructed of a frangible, wear resistant material. In some examples, the stop plate is constructed of a harder material than the rub strip. In such examples, any wear is biased to the rub strip, which can be easily remove and replaced.

The example stop plate arrangement is designed to work in one direction, such that the wing tip can still rotate/fold upward when the aircraft is on the ground. In some examples, the contact line between the stop plate and the fixed wing portion is located inboard of the hinge axis of the wing tip. This allows the stop plate to limit any relative upward movement of the wing tip during flight, but still allow the inboard portion of the wing tip to be rotated downward when the wing tip is folded.

While the examples disclosed herein are described in connection with a trailing edge section of a wing, the examples disclosed herein can also be implemented in connection with a leading edge section of a wing or any other discontinuous surface on an aircraft.

FIG. 1 illustrates an example aircraft 100 in which the examples disclosed herein may be implemented. In the illustrated example, the aircraft 100 includes a fuselage 102, a first or left wing 104 coupled to the fuselage 102, and a second or right wing 106 coupled to the fuselage 102. The first and second wings 104, 106 carry respective engines 108, 110. In the illustrated example, the first and second wings 104, 106 include wing tips, which may be transitioned from an extended or flight position (as shown in the position in FIG. 1) to a stored or folded position to decrease a wingspan 112 of the aircraft 100. In particular, the first wing 104 includes a first fixed wing portion 114 (e.g., an inboard wing portion) and a first wing tip 116 (e.g., a non-fixed portion, an outboard wing portion). The first fixed wing portion 114 is coupled to and extends from the fuselage 102. The first wing tip 116 is moveably (e.g., rotatably, hingeably) coupled to the first fixed wing portion 114 and rotates or folds upward about a hinge axis to move between the extended position (the position shown in FIG. 1) and the folded position (the position shown in FIG. 3B). Similarly, the second wing 106 includes a second fixed wing portion 118 and a second wing tip 120, which is moveably (e.g., rotatably, hingeably) coupled to the second fixed wing portion 118. To reduce the wingspan 112, such as after landing, before taxiing to a gate, etc., the first and second wing tips 116, 120 may be moved to the folded position. The first and second wing tips 116, 120 are actuated by respective first and second wing tip actuators 122, 124 to move or transition the first and second wing tips 116, 120 between the extended position, as shown in FIG. 1, and the folded position, in which the first and second wing tips 116, 120 are rotated upwards. The first and second wing tip actuators 122, 124 may be hydraulic actuators, for example. In some examples, the first and second wing tips 116, 120 are about 10 feet in length. As such, the wingspan 112 can be decreased by about 20 feet by folding the first and second wing tips 116, 120. When in the folded position, the aircraft 100 may comply with the ICAO Code E size limitations (e.g., under 65 meters), for example. In other examples, the first and second fixed wing portions 114, 118 and/or the first and second wing tips 116, 120 may be longer or shorter, and the first and/or second wing tips 116, 120 may be folded up, down, forward, aft or a combination thereof.

In the illustrated example, the first and second wings 104, 106 of the example aircraft 100 carry multiple control surfaces (e.g., aerodynamic surfaces, auxiliary airfoils, etc.) that are located on the first and second wings 104, 106 (e.g., along the leading and trailing edges of the first and second wings 104, 106). The control surfaces may be displaced or extended to change the aerodynamic lift of the aircraft 100 during takeoff or landing, for example. The control surfaces may include ailerons, flaperons, slats, spoilers, etc.

To avoid redundancy, the examples disclosed herein are described in connection with the first wing 104. However, it is understood that any of the examples disclosed herein can be similarly applied to the second wing 106.

Figure 2:
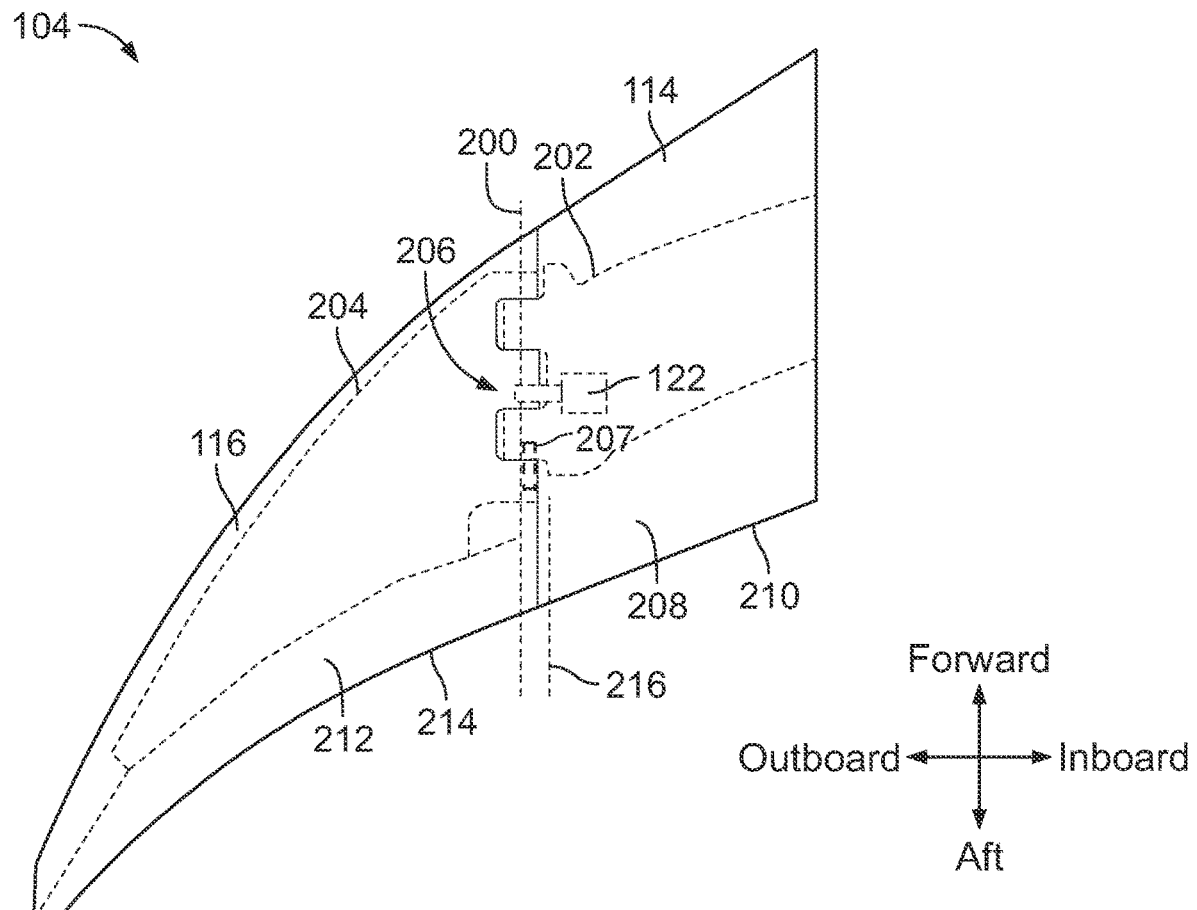
FIG. 2 is a top view of an example wing of the example aircraft of FIG. 1 showing an example wing tip.
Figure 3A:
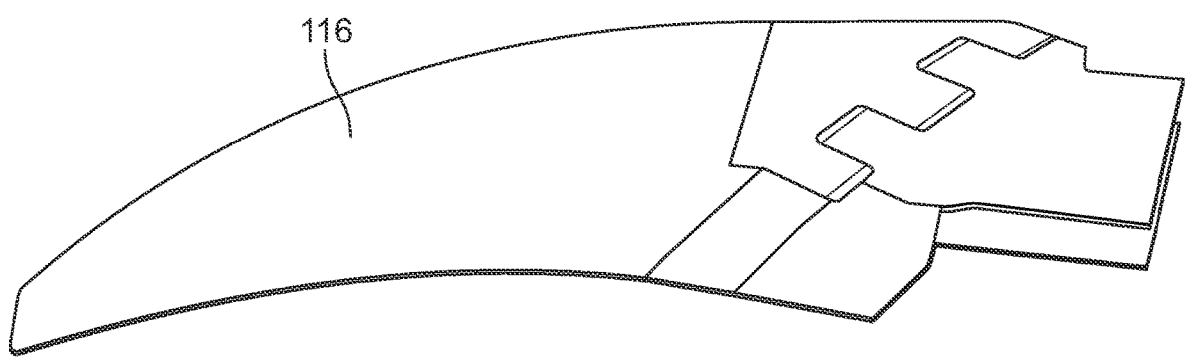
FIG. 3A shows the example wing tip of FIG. 2 in an extended position.
Figure 3B:
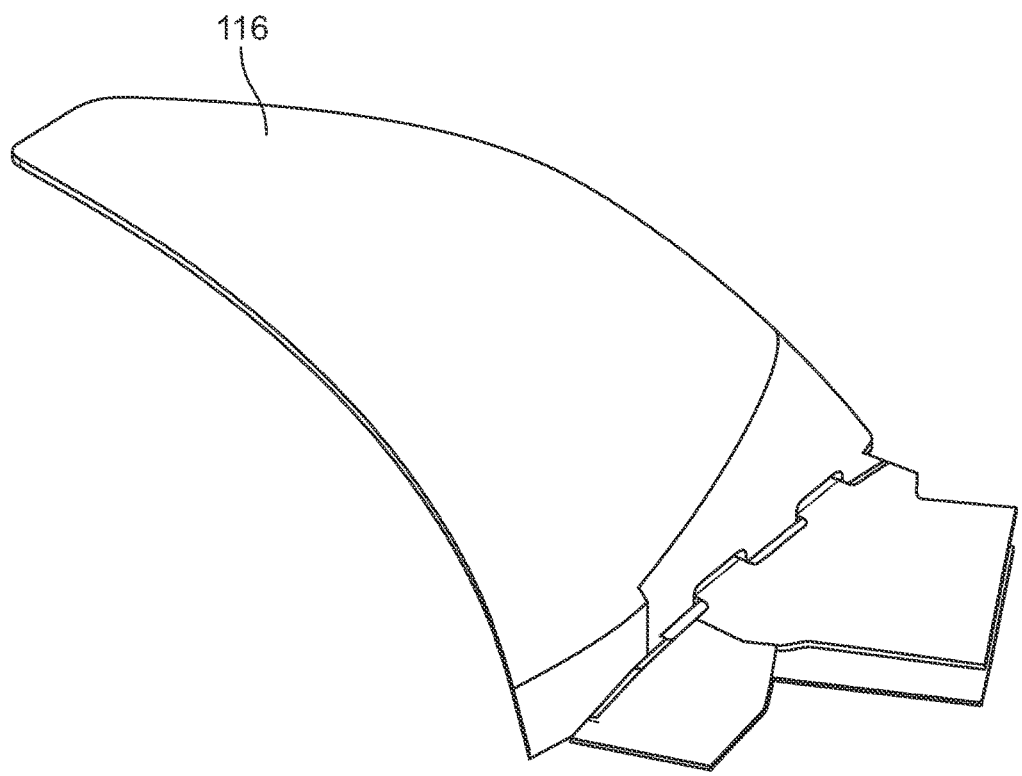
FIG. 3B shows the example wing tip of FIG. 2 in a folded position.

FIG. 2 is a top view of the first wing 104 with the first wing tip 116 in the extended position. The first wing tip 116 is moveably coupled to the first fixed wing portion 114 about a hinge axis 200. The first wing tip 116 can be rotated about the hinge axis 200 via the first wing tip actuator 122. In particular, the first wing tip 116 can be rotated between the extended position, as shown in FIG. 3A, and a folded position, as shown in FIG. 3B. In the illustrated example of FIG. 2, the first fixed wing portion 114 has a wing box 202 (shown in dashed lines) formed by one more structural members such as ribs and/or spars in the first fixed wing portion 114. The first wing tip 116 also has a wing box 204 (shown in dashed lines) formed by one or more structural members. The wing boxes 202, 204 have lugs that cooperate to form a hinge 206, which enables the first wing tip 116 to rotate or pivot about the hinge axis 200. The first wing tip actuator 122 can be activated to move the first wing tip 116 about the hinge axis 200. In some examples, the first wing tip actuator 122 is a geared rotary actuator (GRA). In other examples, another type of actuator may be implemented. In some examples, the first wing 104 includes a latching or locking mechanism 207 that locks the first wing tip 116 in the extended position. In particular, the locking mechanism 207 locks the wing boxes 202, 204 together.

In the illustrated example, the first fixed wing portion 114 has a trailing edge section 208 that is aft of the wing box 202. The trailing edge section 208 tapers to a trailing edge 210 of the first fixed wing portion 114. Similarly, the first wing tip 116 has a trailing edge section 212 aft of the wing box 204. The trailing edge section 212 tapers to a trailing edge 214 of the first wing tip 116. An example contact line 216 is also shown in FIG. 2 and discussed in further detail herein.

When the first wing tip 116 is in the extended position, the wing boxes 202, 204 can be pinned or locked together via a locking mechanism. However, the leading and trailing edge sections of the first fixed wing portion 114 and the first wing tip 116 are not pinned or locked together. During flight (and/or when the aircraft 100 is on the ground), the first wing 104 generates lift resulting in wing bending. While the trailing edge section 208 of the first fixed wing portion 114 is connected at the side-of-body to the fuselage 102 (FIG. 1), the trailing edge section 212 of the first wing tip 116 is cantilevered from the wing box 204 and, thus, is discontinuous with the trailing edge section 208 of the first fixed wing portion 114. Therefore, this wing bending can cause the trailing edge section 212 of the first wing tip 116 to flex or deflect upward relative to the trailing edge section 208 of the first fixed wing portion 114. This disrupts the airflow over and under the first wing 104, which results in loss of lift and aerodynamic performance.

Disclosed herein are example apparatus and methods that can be used to limit (e.g., reduce or prevent) the trailing edge section 212 of the first wing tip 116 from deflecting and/or otherwise moving upward relative to the trailing edge section 208 of the first fixed wing portion 114. As such, the trailing edge sections 208, 212 and the trailing edges 210, 214 remain more aligned, which improves lift performance.

Figure 4:
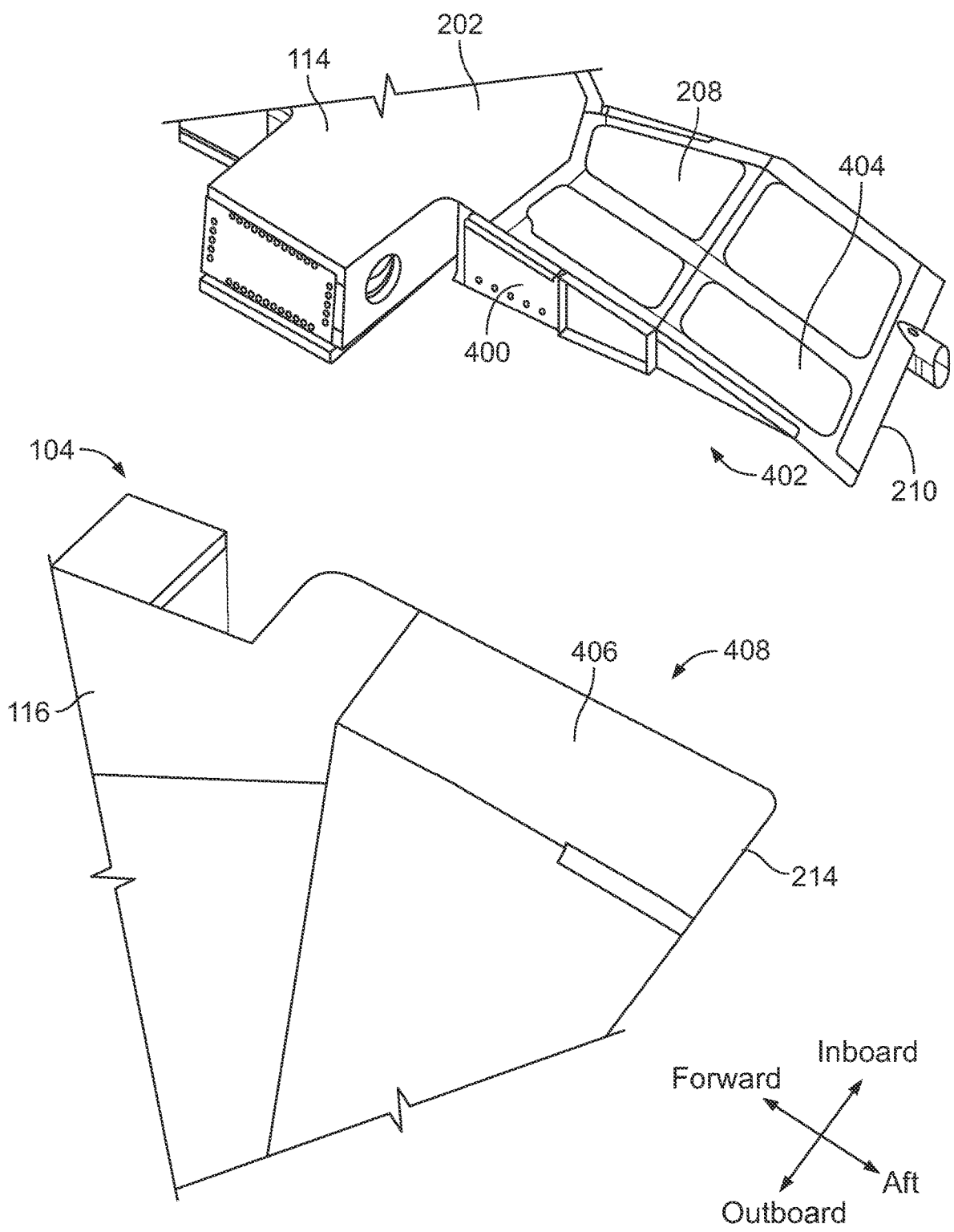
FIG. 4 is a perspective view of the example wing tip of FIG. 2 shown as separated from an example fixed wing portion of the example wing.

FIG. 4 is a partially-exploded, perspective view of the first wing 104, showing the first wing tip 116 as separated from the first fixed wing portion 114. The first fixed wing portion 114 includes a rib 400 along an outboard side 402 of the first fixed wing portion 114. The rib 400 is referred to herein as the outboard rib 400. The outboard rib 400 may also be referred to as a first rib or a fixed rib. The outboard rib 400 is in the trailing edge section 208 of the first fixed wing portion 114. The outboard rib 400 is the outboard most rib (relative to the fuselage 102 (FIG. 1)) in the trailing edge section 208 of the first fixed wing portion 114. The outboard rib 400 is coupled to the wing box 202 and extends aft from the wing box 202. The outboard rib 400 is wedge shaped. In the illustrated example, an upper panel 404 is coupled to a top of the outboard rib 400. The upper panel 404 forms a top surface of the trailing edge section 208. The upper panel 404 can extend to the trailing edge 210 of the trailing edge section 208. The upper panel 404 can be constructed of multiple panels.

In the illustrated example, the first wing tip 116 has an upper panel 406 that extends to an inboard side 408 of the first wing tip 116. The upper panel 404 forms a top surface of the trailing edge section 212. In some examples, an aft edge of the upper panel 406 forms the trailing edge 214 of the first wing tip 116. When the first wing tip 116 is coupled to the first fixed wing portion 114 and is in the extended position, the upper panels 404, 406 are disposed adjacent each other and form a substantially continuous top surface of the first wing 104.

Figure 5:
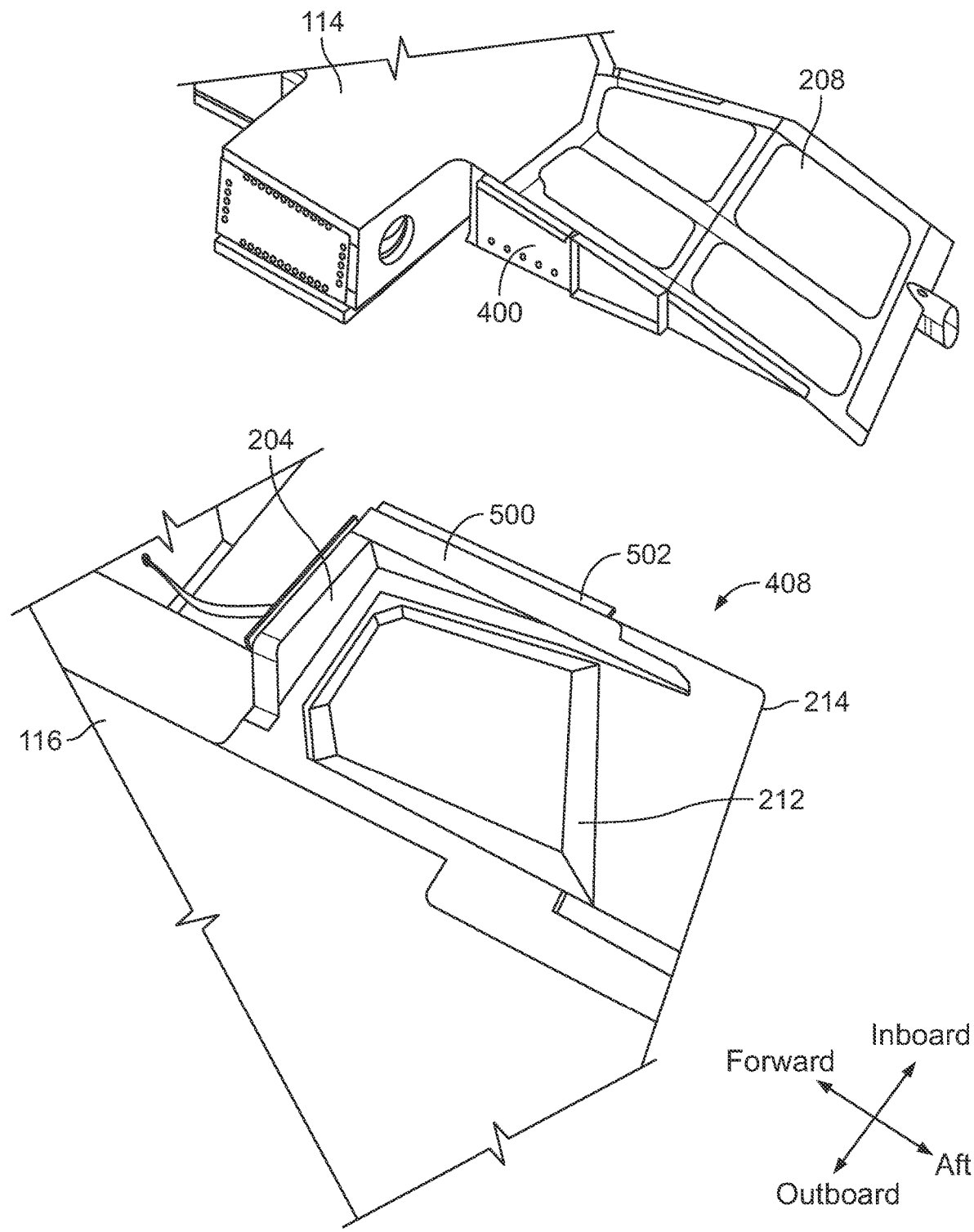
FIG. 5 is the same view as FIG. 4 with an example upper panel of the example wing tip removed.

FIG. 5 shows a similar view to that shown in FIG. 4, of the first wing tip 116, but with the upper panel 406 (FIG. 4) omitted to more clearly show other structural features. The first wing tip 116 includes a rib 500 along the inboard side 408 of the first wing tip 116. The rib 500 is referred to herein as the inboard rib 500. The inboard rib 500 may also be referred to as a second rib or a moving/folding rib. The inboard rib 500 is disposed in the trailing edge section 212 of the first wing tip 116. The inboard rib 500 is the inboard most rib (relative to the fuselage 102 (FIG. 1)) in the trailing edge section 212 of the first wing tip 116. The inboard rib 500 is coupled to the wing box 204 and extends aft from the wing box 204. The inboard rib 500 is wedge shaped. The upper panel 406 (FIG. 4) can be coupled to a top of the inboard rib 500. When the first wing tip 116 is coupled to the first fixed wing portion 114 and in the extended position, the inboard rib 500 is disposed parallel to and adjacent the outboard rib 400. In some examples, the outboard and inboard ribs 400, 500 are constructed of aluminum. In other examples, the ribs can be constructed of other materials.

Figure 8:
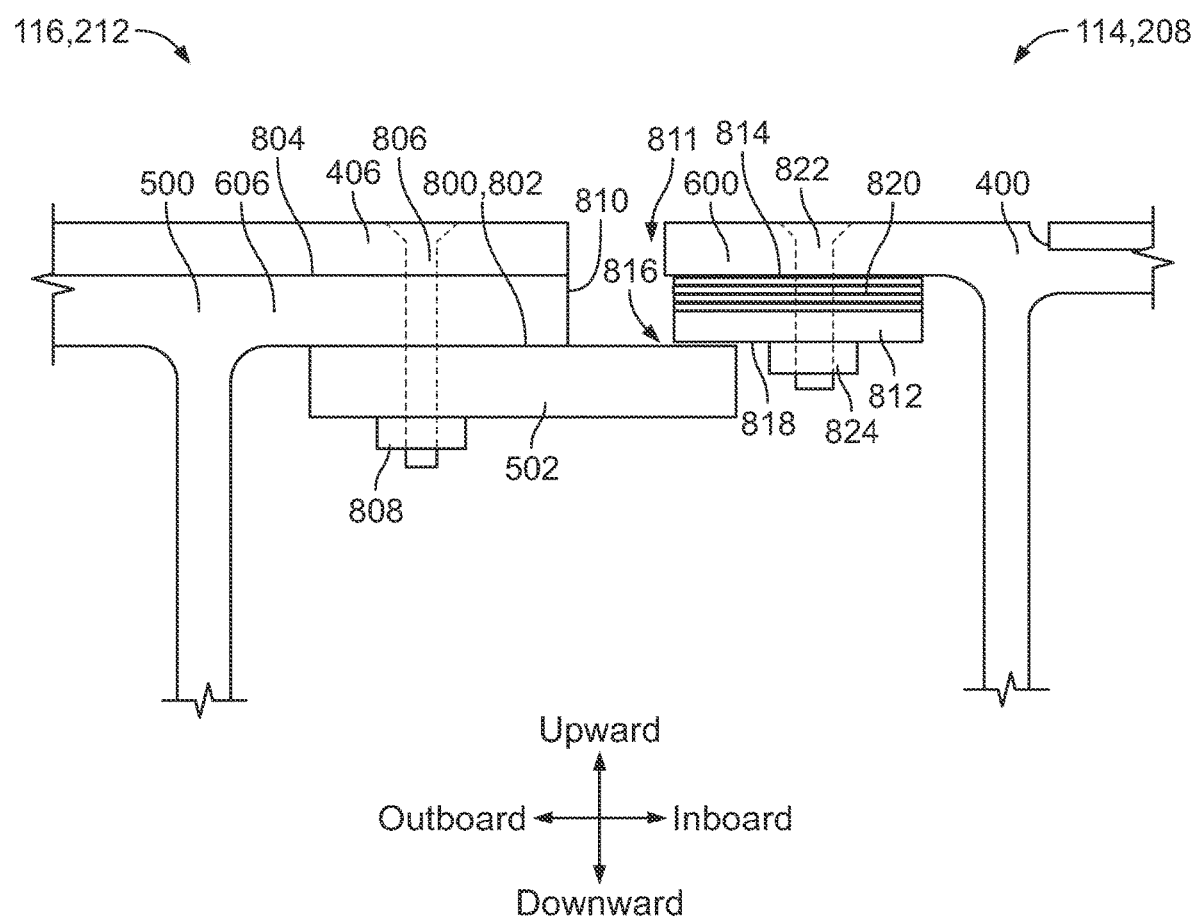
FIG. 8 is a cross-sectional view taken along line A-A of FIG. 7.

In the illustrated example, the first wing tip 116 includes an example stop plate 502. In this example, the stop plate 502 is coupled to the inboard rib 500. With reference also to FIG. 8, the stop plate 502 extends inboard from the inboard rib 500, toward the first fixed wing portion 114. When the first wing tip 116 is in the extended position, the stop plate 502 (or at least a portion of the stop plate 502) is disposed below a portion of the outboard rib 400 of the first fixed wing portion 114, which limits (e.g., reduces, prevents) upward deflection of the trailing edge section 212 of the first wing tip 116 relative to the first fixed wing portion 114 and, in particular, to the trailing edge section 208 of the first fixed wing portion 114. However, the stop plate 502 is positioned such that it does not interfere with the first wing tip 116 rotating to the folded position (FIG. 3B). The stop plate 502 only limits (e.g., reduces, prevents) upward deflection of the trailing edge section 212 once the first wing tip 116 is in the extended position. The inboard rib 500 with the stop plate are located inboard of the hinge axis 200 (FIG. 2). As such, when the first wing tip 116 is rotated to the folded position (FIG. 3B), the inboard rib 500 and the stop plate 502 move downward relative to the outboard rib 400.

In this example, the stop plate 502 only extends outward from a portion of the inboard rib 500. The stop plate 502 does not extend all the way to the trailing edge 214 of the first wing tip 116. However, in other examples, the stop plate 502 can extend all the way to the trailing edge 214 of the first wing tip 116.

Figure 6:
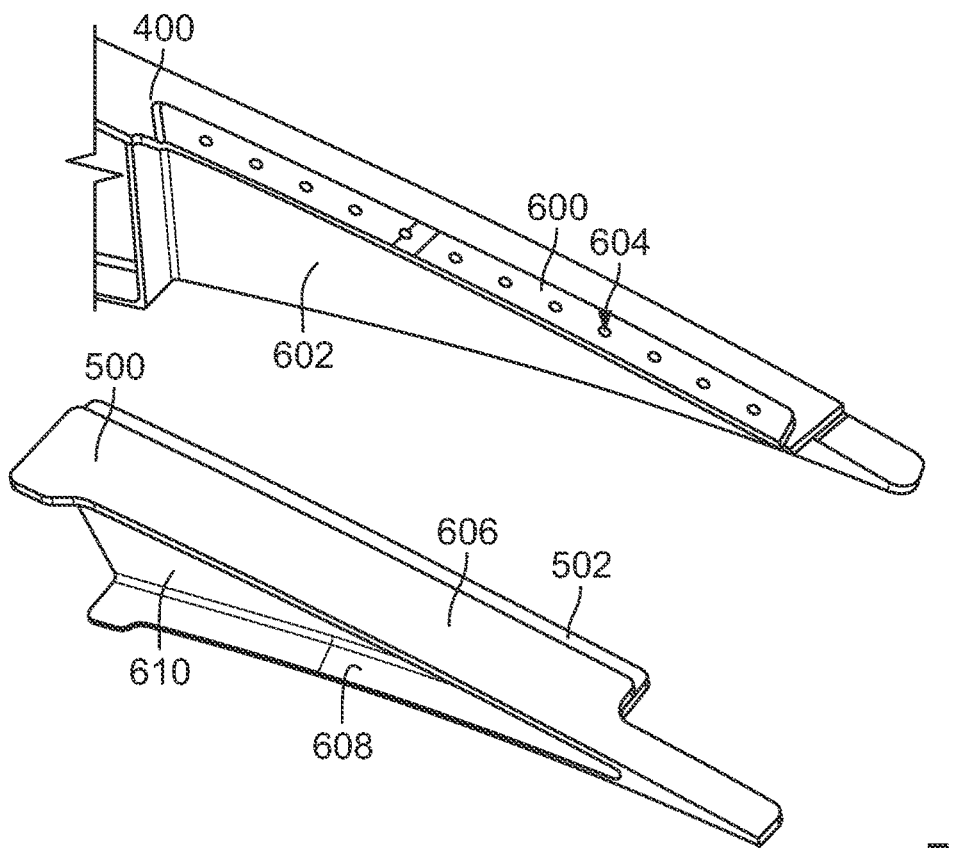
FIG. 6 is an enlarged view of an example outboard rib and example inboard rib from FIGS. 4 and 5.
Figure 7:
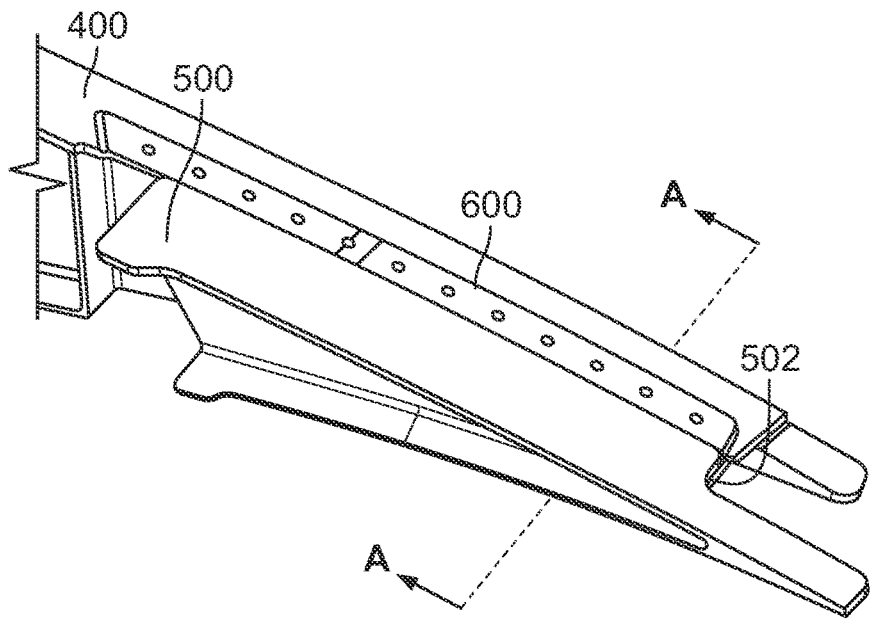
FIG. 7 shows the example outboard rib and the example inboard rib disposed adjacent each other.

FIGS. 6 and 7 both show an enlarged view of the outboard rib 400 and the inboard rib 500, with surrounding structure mostly omitted for the sake of explanation. Whereas FIG. 7 shows the outboard and inboard rib structure in their respective positions in a configuration when the first wing tip (as shown in FIG. 4) is in the extended position, FIG. 6 shows the components in the same orientation as in FIG. 7, but spaced apart, for the sake of explanation. As can be seen in FIG. 6, the outboard rib 400 has a top flange 600 and a web 602 coupled to the top flange 600. In the illustrated example, the top flange 600 has a plurality of fastener openings 604 (one of which is referenced in FIG. 6). The fastener openings 604 can be used to receive fasteners for coupling a rub strip to the top flange 600, disclosed in further detail in conjunction with FIG. 8

In the illustrated example of FIG. 6, the inboard rib 500 has a top flange 606, a bottom flange 608, and a web 610 coupled between the top flange 606 and the bottom flange 608. In this example, the stop plate 502 is coupled to a bottom side of the top flange 606. The stop plate 502 extends inboard from the inboard rib 500, toward the outboard rib 400.

FIG. 7 shows the outboard rib 400 and the inboard rib 500 when the first wing tip 116 (FIG. 4) is in the extended position. As shown, the stop plate 502 is disposed below the top flange 600 of the outboard rib 400. In other words, the stop plate 502 overlaps with the top flange 600 of the outboard rib 400 in the vertical direction. As such, if bending loads are incurred on the first wing 104 (FIG. 4), the stop plate 502 may contact or engaged the underside of the top flange 600 of the outboard rib 400, which prevents or reduces upward deflection of the trailing edge section 212 (FIG. 4) of the first wing tip 116 relative to the first fixed wing portion 114 (FIG. 4).

FIG. 8 is a cross-sectional view taken along line A-A of FIG. 7. As shown in FIG. 8, the stop plate 502 is coupled to a bottom side 800 of the top flange 606 of the inboard rib 500. In some examples, a top side 802 of the stop plate 502 is in contact with the bottom side 800 of the top flange 606. In other examples, one or more spacers can be disposed between the stop plate 502 and the top flange 606. In the illustrated example, the upper panel 406 is coupled to a top side 804 of the top flange 606. In some examples, the stop plate 502 is coupled to the top flange 606 via one or more fasteners 806. In some examples the fastener(s) 806 extend through the upper panel 406, the top flange 606, and the stop plate 502. One of the fastener(s) 806 is shown in FIG. 8. In this example, the fastener 806 is implemented as a bolt. The bolt 806 extends through the upper panel 406, the top flange 606, and the stop plate 502. In some examples, a head of the bolt 806 is counter-sunk into the upper panel 406. A nut 808 is threaded onto the bottom of the bolt 806 to secure (e.g., clamp) the stop plate 502 to the top flange 606. In other examples, the stop plate 502 can be coupled to the inboard rib 500 via other mechanical and/or chemical fastening techniques (e.g., rivets, welding, etc.). As shown in FIG. 8, the stop plate 502 extends inboard from the inboard rib 500, beyond an inboard edge 810 of the top flange 606. The stop plate 502 extends at least as far as a gap 811 between the inboard rib 500 and the outboard rib 400. As shown in FIG. 8, the stop plate 502 extends below the top flange 600 of the outboard rib 400, which limits (e.g., reduces, prevents) upward deflection of the trailing edge section 212 of the first wing tip 116 relative to the first fixed wing portion 114. The outboard rib 400 is designed (e.g., via thickness of the flanges, the radius of the joints, etc.) to accommodate upward force from the stop plate 502 under loads.

In some examples, the first fixed wing portion 114 includes a rub strip 812 to be engaged or contacted by the stop plate 502. The rub strip 812 may also be referred to a second stop plate. The rub strip 812 is coupled to the outboard rib 400. In particular, in this example, the rub strip 812 is coupled to a bottom side 814 of the top flange 600 of the outboard rib 400. In this example, the rub strip 812 does not extend outboard of the top flange 600 of the outboard rib 400. However, in other examples, the rub strip 812 can extend outboard of the top flange 600. The stop plate 502 and the rub strip 812 are coplanar.

In some examples, the stop plate 502 and the rub strip 812 are positioned such that when the first wing tip 116 is in the extended position and no upward loads are imparted on the trailing edge section 212 of the first wing tip 212, there is a small gap 816 between the top side 802 of the stop plate 502 and a bottom side 818 of the rub strip 812. Should the first wing 104 incur any loads, the trailing edge section 212 of the first wing tip 116 may deflect slightly upward (e.g., the distance of the gap 816) until the top side 802 of the stop plate 502 engages the bottom side 818 of the rub strip 812, which limits further upward deflection. In some examples, the gap 816 is relatively small, such as 0.0050-0.0150 inches. In other examples, the gap 816 may be smaller or larger. However, in other examples, the stop plate 502 and the rub strip 812 are positioned such that when the first wing tip 116 is in the extended position and no upward loads are on the first wing 104, the top side 802 of the stop plate 502 is engaged with the bottom side 818 of the rub strip 812. The stop plate 502 engages the rub strip 812 along a contact line 216 shown in FIG. 2. The contact line 216 is inboard of the hinge axis 200. This enables the stop plate 502 to limit movement in one direction (upward), but still allow the inboard portion of the first wing tip 116 to be rotated in the opposite direction (downward) to the folded position.

In some examples, one or more spacers 820 (also referred to as shims) (one of which is referenced in FIG. 8) can be disposed between the bottom side 814 of the top flange 600 and the rub strip 812. The spacers 820 can be used to account for any manufacturing tolerances and accurately position the rub strip 812 relative to the stop plate 502 in a desired location. For example, one or more spacers 820 can be added between the rub strip 812 and the top flange 600 to position the rub strip 812 in a location such that when the first wing tip 116 is in the extended position, the stop plate 502 and the rub strip 812 parallel to each other and spaced apart (e.g., by the gap 811) or contacting each other. Further, the folding wing tips can be designed to be interchangeable, which allows them to be easily replaced with a new one. In order to replace a wing tip there are a couple of locations that are designed to be rigged (e.g., adjusted), such as by using pads, plates, shims, spacers, etc. One location is the down stop pads on the wing boxes 202, 204 that form the hinge.

Another location can be the stop plate 802 and/or the rub strip 812 on the trailing edge sections 208, 212. These structures can be adjusted (e.g., shimmed). For example, the spacers 820 on the fixed side of the deflection control device can be adjusted such that the relative position of the two sides of the outboard rib 400 and the inboard rib 500 align correctly. During operation of an aircraft, parts of the aircraft are susceptible to damage such as impacts and/or lightning strikes that may result in the need for repair or maintenance. An operator may elect to replace the wing tip with a spare, such that they can continue to operate the aircraft while the wing tip is undergoing repair or maintenance. While in this example one or more spacers 820 are used, in other examples, spacers may not be used. Instead, the rub strip 812 can be coupled directly to the bottom side 814 of the top flange 600.

In some examples, the rub strip 812 is coupled to the top flange 600 of the outboard rib 400 via one or more fasteners 822. In some examples, the fasteners 822 extend through the top flange 600, the spacers 820, and the rub strip 812. For example, the fasteners 822 can extend through the fastener openings 604 shown in FIG. 6. One of the fasteners 822 is shown in FIG. 8. In this example, the fastener 822 is implemented as a bolt. The bolt 822 extends through the top flange 600, the spacers 820, and the rub strip 812. In some examples, a head of the bolt 822 is counter-sunk into the top flange 600. A nut 824 is threaded onto the bottom of the bolt 822 to secure (e.g., clamp) the rub strip 812 to the top flange 600. In other examples, the rub strip 812 can be coupled to the outboard rib 400 via other mechanical and/or chemical fastening techniques (e.g., rivets, welding, etc.).

Over time, one or both of the stop plate 502 and the rub strip 812 may become worn and/or otherwise reach a condition in which replacement is desired. However, the stop plate 502 and the rub strip 812 are relatively small, inexpensive to manufacture, and easily replaceable. Therefore, using the stop plate 502 and the rub strip 812 helps to reduce or prevent wear or damage to the structural components (e.g., the ribs or spars) of the first wing 104.

In some examples, the stop plate 502 and the rub strip 812 are constructed of wear resistant materials that are durable to fretting. In some examples, the stop plate 502 and/or the rub strip 812 are constructed of a frangible material (e.g., an aluminum-silicon bronze alloy). A frangible material is selected that does not yield during normal operating conditions (e.g., from wing bending/deflection occurring during flight), but yields when subjected to a significantly high impact or force outside of the normal operating conditions. In some examples, the stop plate 502 is constructed of a harder material than the rub strip 812. As such, any wear is biased to the rub strip 812, which can be replaced after a certain amount of wear. For example, the stop plate 502 can be constructed of a metal, such as aluminum, and the rub strip 812 can be constructed of a phenolic material, such as epoxy resin. In other examples, the stop plate 502 and/or the rub strip 812 can be constructed of other types of materials.

In other examples, the rub strip 812 may not be included. Instead, the stop plate 502 may engage the bottom side 814 of the top flange 600 of the outboard rib 400 to limit the upward deflection.

Figure 9:
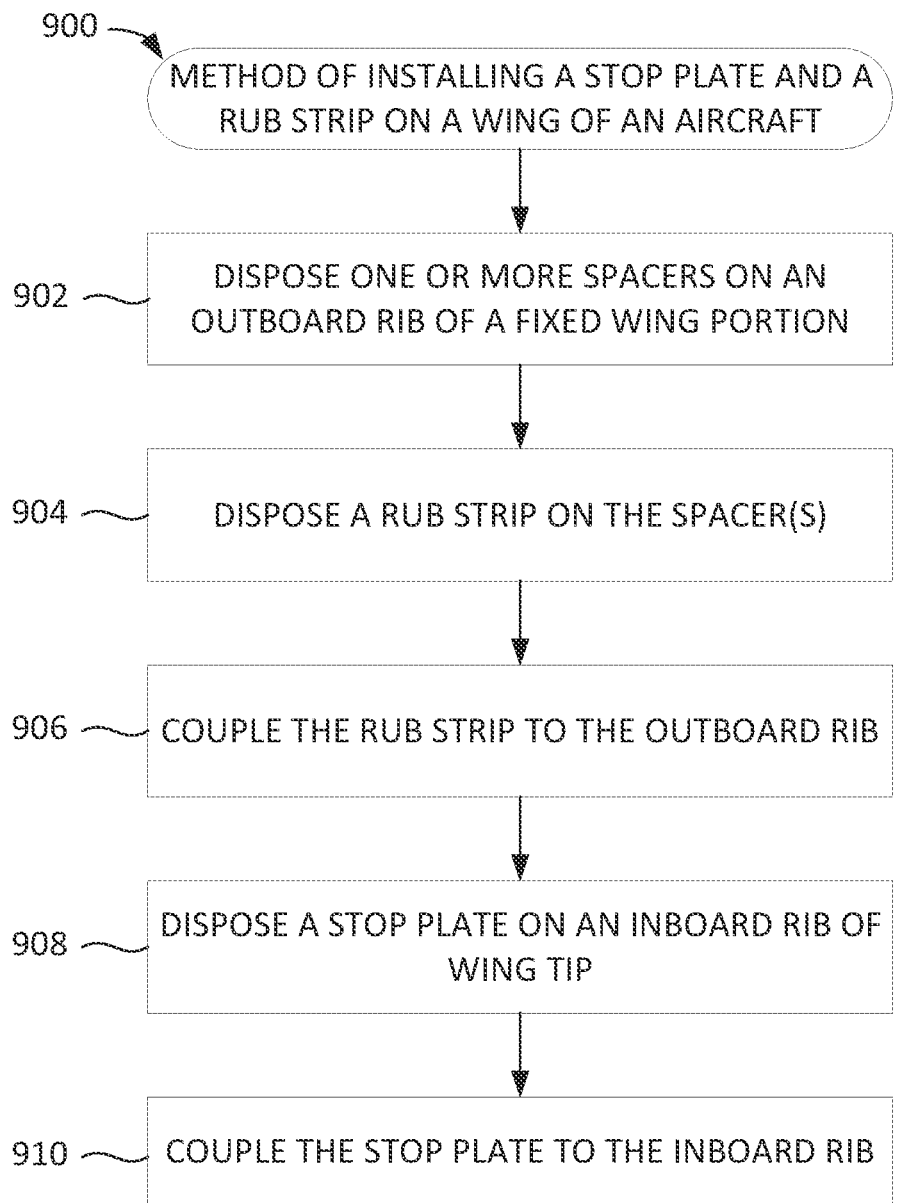
FIG. 9 is a flowchart representative of an example method of installing an example stop plate and an example rub strip and a wing of an aircraft.

FIG. 9 is a flowchart illustrating an example method 900 for installing a stop plate and a rub strip on an aircraft wing having a folding wing tip. The example method 900 may be performed by a human and/or by an automated machine. Any of the example blocks in FIG. 9 can be rearranged, combined, omitted, replaced, and/or repeated.

In some examples, one or more spacers can be used to position the rub strip 812 relative to the outboard rib 400. Therefore, at block 902, the spacers 820 can be disposed on the outboard rib 400. For example, the spacers 820 can be disposed on the bottom side 814 of the top flange 600 of the outboard rib 400.

At block 904, the rub strip 812 is disposed on the spacer(s) 820. If no spacers are used, the rub strip 812 can be disposed directly on the outboard rib 400 (e.g., on the bottom side 814 of the top flange 600).

At block 906, the rub strip 812 is coupled to the outboard rib 400. For example, as shown in FIG. 8, the rub strip 812 can be coupled to the outboard rib 400 via one or more of the fasteners 822. The fasteners 822 extend through the top flange 600, the spacers 820, and the rub strip 812. In other examples, the rub strip 812 (and the spacer(s) 820) can be coupled to the outboard rib 400 via other mechanical and/or chemical fastening techniques (e.g., rivets, welding, etc.).

At block 908, the stop plate 502 is disposed on the inboard rib 500. For example, the stop plate 502 can be disposed on the bottom side 800 of the top flange 606 of the inboard rib 500.

At block 910, the stop plate 502 is coupled to the inboard rib 500. For example, as shown in FIG. 8, the stop plate 502 is coupled to the top flange 606 via one or more of the fasteners 806. In other examples, the stop plate 502 can be coupled to the inboard rib 500 via other mechanical and/or chemical fastening techniques (e.g., rivets, welding, etc.). The stop plate 502 is coupled to the inboard rib 500 such that the stop plate 502 extends inboard of the inboard rib 500 and such that when the first wing tip 116 is in the extended position, the top side 802 of the stop plate 502 contacts the bottom side 818 of the rub strip 812 to limit upward deflection of the trailing edge section 212 of the first wing tip 116 relative to the trailing edge section 208 of the first fixed wing portion 114. In some examples, after initial rigging, no additional adjustments are required to the stop plate 502 and/or the rub strip 812.

Figure 10:
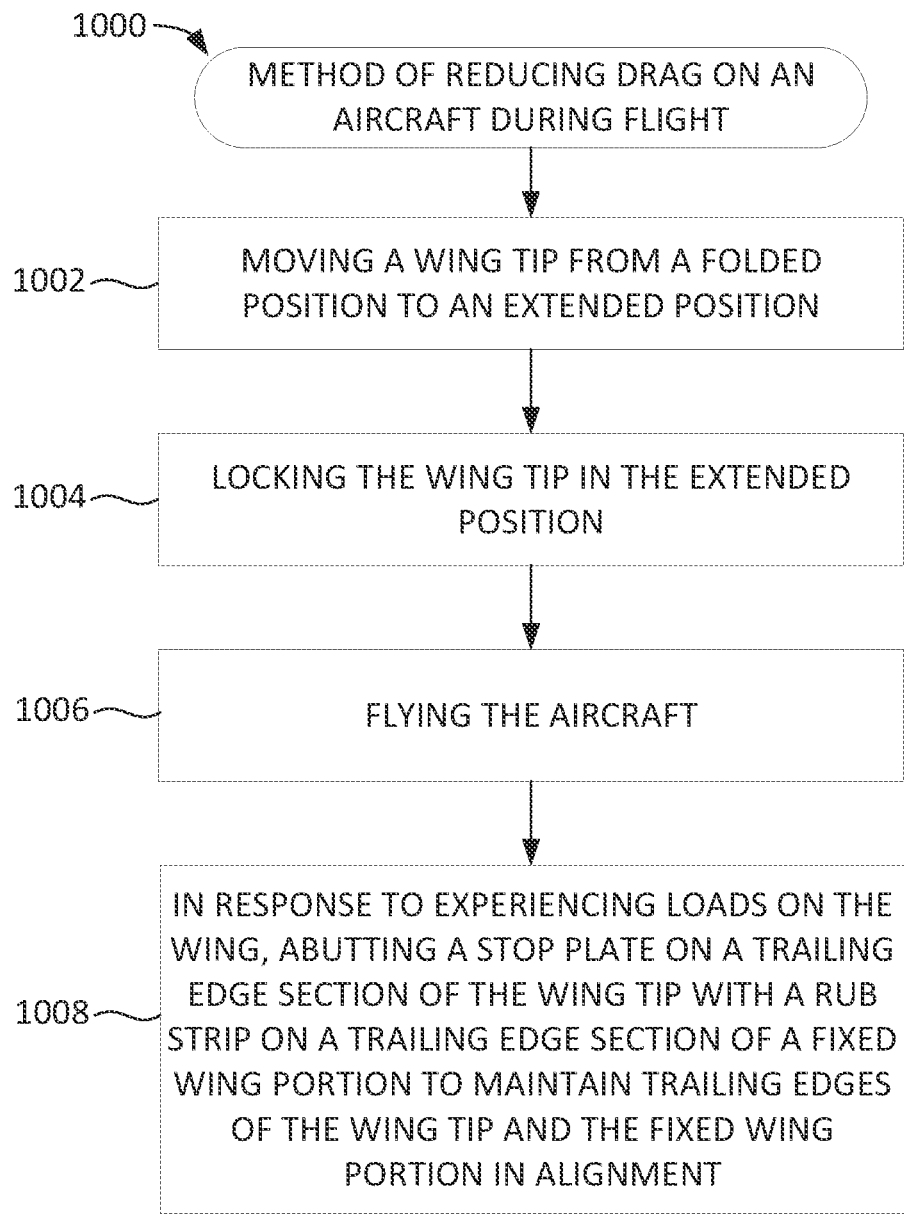
FIG. 10 is a flowchart representative of an example method of reducing drag on an aircraft during flight.

FIG. 10 is a flowchart illustrating an example method 1000 of reducing drag on an aircraft during flight, which may be at least partially achieved using the example stop plate 502 and/or the example rub strip 812 disclosed herein. The example method 1000 is described in connection with the first wing 104 of the aircraft 100. However, the example method 1000 can be similarly performed in connection with the second wing 106. Any of the example blocks in FIG. 10 can be rearranged, combined, omitted, replaced, and/or repeated.

The example method 1000 can begin when the aircraft 100 is on the ground before take-off. Block 1002 includes moving the first wing tip 116 from the folded position (FIG. 3B) to the extended position (FIG. 3A). For example, the first wing tip actuator 122 can be activated to move the first wing tip 116 from the folded position to the extended position. In some examples, at block 1004, the method 1000 includes locking the first wing tip 116 in the extended position. For example, the locking mechanism 207 (FIG. 2) can be activated to lock the wing boxes 202, 204 together, such that the first wing tip 116 is maintained in the extended position. When the first wing tip 116 is in the extended position, the stop plate 502 on the trailing edge section 212 of the first wing tip 116 is disposed at least partially below the rub strip 812 on the trailing edge section 208 of the first fixed wing portion 114. In some examples, the first wing tip 116 is moved to the extended position and locked in place (blocks 1002 and 1004) prior to take-off.

Block 1006 includes flying the aircraft 100. During flight, the first wing 104 may experience loads (e.g., bending loads). At block 1008, in response to the loads, the stop plate 502 on the trailing edge section 212 of the first wing tip 116 abuts (e.g., engages, contacts) the rub strip 812 on the first fixed wing portion 114 to maintain the trailing edges 210, 214 of the first fixed wing portion 114 and the first wing tip 116 in alignment. This reduces drag on the aircraft 100 that would otherwise occur if the trailing edges 210, 214 were allowed to separate.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

From the foregoing, it will be appreciated that example methods, apparatus, and articles of manufacture have been disclosed that reduce or prevent upward deflection of a trailing edge section of a wing tip relative to a trailing edge section of a fixed wing portion. This reduces or eliminates airflow interference (e.g., drag) that may otherwise be caused without the example methods and apparatus disclosed herein. As such, the examples disclosed herein improve flight performance.

Examples and example combinations disclosed herein include the following:

Example 1 is an aircraft wing comprising a fixed wing portion. The fixed wing portion includes an outboard rib along an outboard side of the fixed wing portion. The aircraft wing also includes a wing tip moveably coupled to the fixed wing portion about a hinge axis. The wing tip is moveable between an extended position and a folded position. The wing tip includes an inboard rib along an inboard side of the wing tip. The inboard rib is disposed in a trailing edge section of the wing tip. The wing tip also includes a stop plate coupled to the inboard rib. The stop plate extends inboard from the inboard rib such that when the wing tip is in the extended position, the stop plate is disposed below a portion of the outboard rib of the fixed wing portion to limit upward deflection of the trailing edge section of the wing tip relative to the fixed wing portion.

Example 2 includes the aircraft wing of Example 1, wherein the inboard rib has a top flange, a bottom flange, and a web coupled between the top flange and the bottom flange, and wherein the stop plate is coupled to a bottom side of the top flange.

Example 3 includes the aircraft wing of Example 2, wherein the wing tip includes an upper panel coupled to a top side of the top flange. An aft edge of the upper panel forms a trailing edge of the wing tip.

Example 4 includes the aircraft wing of Example 3, wherein the stop plate is coupled to the top flange via one or more fasteners extending through the upper panel, the top flange, and the stop plate.

Example 5 includes the aircraft wing of any of Examples 1-4, wherein the fixed wing portion includes a rub strip coupled to the outboard rib, and wherein the stop plate is to engage with the rub strip when the wing tip is in the extended position to limit upward deflection of the trailing edge section of the wing tip relative to the fixed wing portion.

Example 6 includes the aircraft wing of Example 5, wherein the stop plate is to engage the rub strip along a contact line that is inboard of the hinge axis.

Example 7 includes the aircraft wing of Examples 5 or 6, wherein outboard rib has a top flange and a web coupled to the top flange, and wherein the rub strip is coupled to a bottom side of the top flange.

Example 8 includes the aircraft wing of Example 7, wherein the fixed wing portion includes a spacer between the rub strip and the bottom side of the top flange of the outboard rib.

Example 9 includes the aircraft wing of Examples 7 or 8, wherein the rub strip is coupled to the top flange via fasteners extending through the top flange and the rub strip.

Example 10 includes the aircraft wing of any of Examples 7-9, wherein the rub strip does not extend outboard of the top flange.

Example 11 includes the aircraft wing of any of Examples 5-10, wherein the stop plate is constructed of a harder material than the rub strip.

Example 12 includes the aircraft wing of Example 11, wherein the stop plate is constructed of aluminum and the rub strip is constructed of phenolic material.

Example 13 is an aircraft comprising a fuselage and a fixed wing portion extending from the fuselage. The fixed wing portion includes an outboard rib in a trailing edge section of the fixed wing portion. The outboard rib has a top flange. The aircraft also includes a wing tip rotatably coupled to the fixed wing portion. The wing tip is moveable between an extended position and a folded position. The wing tip includes an inboard rib in a trailing edge section of the wing tip and a stop plate coupled to the inboard rib. The stop plate extends inboard from the inboard rib such that when the wing tip is in the extended position, the stop plate overlaps with the top flange of the outboard rib in a vertical direction to limit upward deflection of the trailing edge section of the wing tip.

Example 14 includes the aircraft of Example 13, wherein the fixed wing portion includes a rub strip coupled to a bottom side of the top flange, and wherein the stop plate is to engage with the rub strip when the wing tip is in the extended position.

Example 15 includes the aircraft of Example 14, wherein the stop plate is to engage the rub strip along a contact line that is inboard of a hinge axis of the wing tip.

Example 16 includes the aircraft of any of Examples 13-15, wherein the inboard rib has a top flange, a bottom flange, and a web coupled between the top flange and the bottom flange, and wherein the stop plate is coupled to a bottom side of the top flange of the inboard rib.

Example 17 includes the aircraft of Example 16, wherein the wing tip includes an upper panel coupled to a top side of the top flange of the inboard rib. An aft edge of the upper panel forming a trailing edge of the wing tip.

Example 18 is a method of reducing drag on an aircraft during flight. The method comprises moving a wing tip of a wing of the aircraft from a folded position to an extended position. The wing has a fixed wing portion. The wing tip is moveably coupled to the fixed wing portion. The fixed wing portion has a trailing edge section with a rub strip. The wing tip has a trailing edge section with a stop plate. The method also includes flying the aircraft and, in response to experiencing loads on the wing, abutting the stop plate on the trailing edge section of the wing tip with the rub strip on the fixed wing portion to maintain trailing edges of the wing tip and the fixed wing portion in alignment.

Example 19 includes the method of Example 18, wherein the trailing edge section of the wing tip includes an inboard rib having a top flange, and wherein the stop plate is coupled to a bottom side of the top flange of the inboard rib.

Example 20 includes the method of Example 19, wherein the trailing edge section of the fixed wing portion includes an outboard rib having a top flange, and wherein the rub strip is coupled to a bottom side of the top flange of the outboard rib.

Although certain example methods, apparatus, and articles of manufacture have been disclosed herein, the scope of coverage of this patent is not limited thereto. On the contrary, this patent covers all methods, apparatus, and articles of manufacture fairly falling within the scope of the claims of this patent.

What is claimed is:

1. An aircraft wing comprising:
   a fixed wing portion, the fixed wing portion including an outboard rib along an outboard side of the fixed wing portion; and
   a wing tip moveably coupled to the fixed wing portion about a hinge axis, the wing tip moveable between an extended position and a folded position, the wing tip including:
      an inboard rib along an inboard side of the wing tip, the inboard rib disposed in a trailing edge section of the wing tip, the inboard rib having an inboard top flange, a bottom flange, and an inboard web coupled between the inboard top flange and the bottom flange;

an upper panel coupled to a top side of the inboard top flange, an aft edge of the upper panel forming a trailing edge of the wing tip; and a stop plate coupled to a bottom side of the inboard top flange of the inboard rib, the stop plate extending inboard from the inboard rib such that when the wing tip is in the extended position, the stop plate is disposed below a portion of the outboard rib of the fixed wing portion to limit upward deflection of the trailing edge section of the wing tip relative to the fixed wing portion, the stop plate coupled to the inboard top flange via one or more fasteners extending through the upper panel, the inboard top flange, and the stop plate.

2. The aircraft wing of claim 1, wherein the fixed wing portion includes a rub strip coupled to the outboard rib, and wherein the stop plate is to engage with the rub strip when the wing tip is in the extended position to limit upward deflection of the trailing edge section of the wing tip relative to the fixed wing portion.

3. The aircraft wing of claim 2, wherein the stop plate is to engage the rub strip along a contact line that is inboard of the hinge axis.

4. The aircraft wing of claim 2, wherein the outboard rib has an outboard top flange and an outboard web coupled to the outboard top flange, and wherein the rub strip is coupled to a bottom side of the outboard top flange.

5. The aircraft wing of claim 4, wherein the fixed wing portion includes a spacer between the rub strip and the bottom side of the outboard top flange of the outboard rib.

6. The aircraft wing of claim 4, wherein the rub strip is coupled to the outboard top flange via one or more fasteners extending through the outboard top flange and the rub strip.

7. The aircraft wing of claim 2, wherein the stop plate is constructed of a harder material than the rub strip.

8. The aircraft wing of claim 7, wherein the stop plate is constructed of aluminum and the rub strip is constructed of phenolic material.

9. An aircraft wing comprising:
a fixed wing portion, the fixed wing portion including:
an outboard rib along an outboard side of the fixed wing portion, the outboard rib having an outboard top flange and an outboard web coupled to the outboard top flange;
a rub strip coupled to a bottom side of the outboard top flange of the outboard rib, wherein the rub strip does not extend outboard of the outboard top flange;
a wing tip moveably coupled to the fixed wing portion about a hinge axis, the wing tip moveable between an extended position and a folded position, the wing tip including:
an inboard rib along an inboard side of the wing tip, the inboard rib disposed in a trailing edge section of the wing tip; and
a stop plate coupled to the inboard rib, the stop plate extending inboard from the inboard rib such that when the wing tip is in the extended position, the stop plate is disposed below a portion of the outboard rib of the fixed wing portion to limit upward deflection of the trailing edge section of the wing tip relative to the fixed wing portion.

10. The aircraft wing of claim 9, wherein the inboard rib has an inboard top flange, a bottom flange, and an inboard web coupled between the inboard top flange and the bottom flange, and wherein the stop plate is coupled to a bottom side of the inboard top flange.

11. The aircraft wing of claim 10, wherein the wing tip includes an upper panel coupled to a top side of the inboard top flange, an aft edge of the upper panel forming a trailing edge of the wing tip.

12. The aircraft wing of claim 11, wherein the stop plate is coupled to the inboard top flange via one or more fasteners extending through the upper panel, the inboard top flange, and the stop plate.

13. The aircraft wing of claim 9, wherein the stop plate includes aluminum and the rub strip includes phenolic material.

14. An aircraft comprising:
a fuselage;
a fixed wing portion extending from the fuselage, the fixed wing portion including an outboard rib adjacent a trailing edge section of the fixed wing portion, the outboard rib having an outboard top flange, the fixed wing portion including a rub strip coupled to a bottom side of the outboard top flange via one or more first fasteners extending through the nib strip and the outboard top flange of the outboard rib; and
a wing tip rotatably coupled to the fixed wing portion, the wing tip moveable between an extended position and a folded position, the wing tip including:
an inboard rib in a trailing edge section of the wing tip; and
a stop plate coupled to the inboard rib, the stop plate extending inboard from the inboard rib such that when the wing tip is in the extended position, the stop plate overlaps with the outboard top flange of the outboard rib in a vertical direction to limit upward deflection of the trailing edge section of the wing tip.

15. The aircraft of claim 14, wherein the stop plate is to engage with the rub strip when the wing tip is in the extended position.

16. The aircraft of claim 15, wherein the stop plate is to engage the rub strip along a contact line that is inboard of a hinge axis of the wing tip.

17. The aircraft of claim 14, wherein the inboard rib has an inboard top flange, a bottom flange, and an inboard web coupled between the inboard top flange and the bottom flange, and wherein the stop plate is coupled to a bottom side of the inboard top flange of the inboard rib.

18. The aircraft of claim 17, wherein the wing tip includes an upper panel coupled to a top side of the inboard top flange of the inboard rib, an aft edge of the upper panel forming a trailing edge of the wing tip.

19. The aircraft wing of claim 17, the rub strip is removably coupled to the outboard top flange via the one or more fasteners.

20. The aircraft wing of claim 17, wherein the stop plate is coupled to the inboard top flange via one or more second fasteners extending through the inboard top flange and the stop plate.

* * * * *